June 4, 1935.　　　　P. H. ELLIOTT　　　　2,003,742

APPARATUS FOR UTILIZING HEAT TRANSFERRING MEDIUM

Filed March 30, 1933

Inventor
Phillip H. Elliott

By　A. H. Byrne

Attorney

Patented June 4, 1935

2,003,742

UNITED STATES PATENT OFFICE 2,003,742

APPARATUS FOR UTILIZING HEAT TRANSFERRING MEDIUM

Phillip H. Elliott, Charleston, W. Va., assignor to Chemical Manufacturing Company, Point Pleasant, W. Va., a corporation of West Virginia Application March 30, 1933, Serial No. 663,664

5 Claims. (Cl. 122—17)

This invention relates to water heaters generally, and more particularly to domestic and other water heaters of that type having as a primary source of heat a gas burner, an oil burner or an electric heating unit.

This invention has for one of its objects to provide a heater of the character stated through the medium of which water may be heated to the required temperature in shorter time, and through the medium of which the water may be maintained at the required temperature more economically than is possible with heaters as now constructed.

To attain the foregoing and other objects, the nature of which will appear as the description proceeds, the invention comprehends interposing between the water and the primary source of heat a heat transferring liquid having a boiling point higher than that of water and having a specific heat lower than that of water.

The invention further comprehends a heater of the character stated having a chamber or chambers for the reception of the heat transferring liquid, and wherein the chamber or chambers are located between the primary source of heat and the water and so related to both as to enable the heat transferring liquid to transfer substantially all the heat units generated by the source to the water.

The invention is hereinafter fully described and claimed, and illustrated in the accompanying drawing, wherein:

Figure 2:
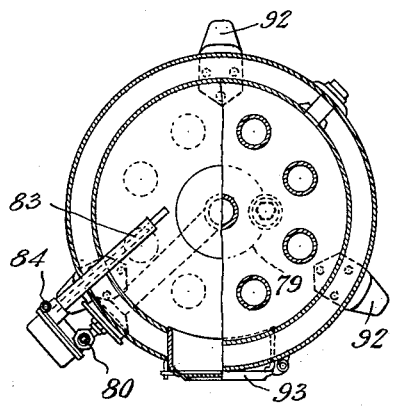
Figure 2 is a sectional view taken on the planes indicated by the line 2—2 in Figure 1.
Figure 1:
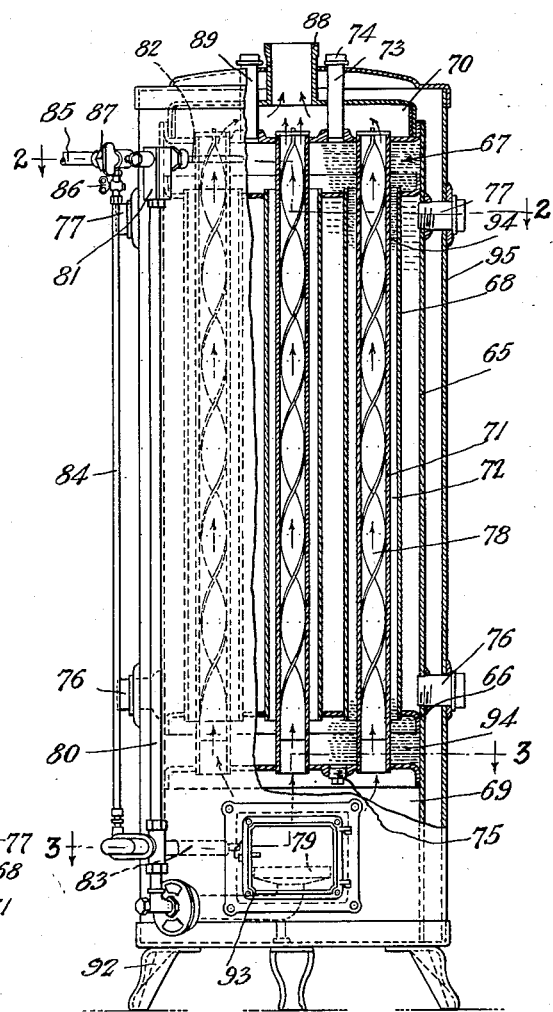
Figure 1 is a view partly in front elevation and partly in side elevation of the heater.
Figure 3:
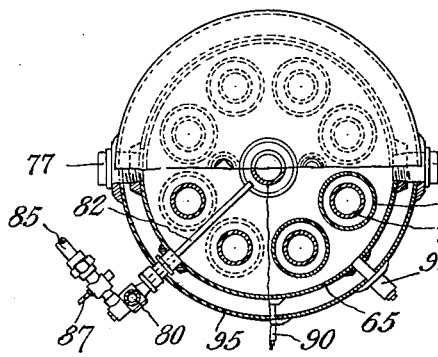
Figure 3 is a sectional view taken on the planes indicated by the line 3—3 of Figure 1.

As recited in my copending application, the heat transferring liquid may consist of an oil, or oils, which may have certain mineral salts, catalytic substances or the like dissolved or suspended therein, the resulting composition being so constituted as to have a high boiling point, a relatively low specific heat and stability at relatively high temperatures approaching its boiling point for long continued or indefinite periods of operation.

As a specific example it may be stated, as recited in my copending application, Ser. No. 663,-663, filed March 30, 1933, that the heat transferring liquid or medium may consist of 75 parts of peanut oil, 14 parts of rapeseed oil, 1 part of aluminum stearate and 10 parts of oleic acid. This mixture has a specific heat approximately one-half that of water and will, therefore, require only one-half as much heat to raise it to a given temperature as would the same amount of water, thus making it correspondingly easier to bring the mixture to its operating temperature and storing in itself only one-half as much heat as would some other medium having a specific heat approaching that of water. As a result of its low specific heat, it is also possible to bring it to its operating temperature much more rapidly than water or the like. As this mixture is located in the heater between the primary source of heat and the water, an efficient and rapid transfer of heat from the primary source to the water will take place, due to the fact that the mixture operates at a convenient temperature lying between the relatively high temperature of the primary source of heat and the comparatively low temperature of the water in the tank. It is to be understood that any of the other mixtures recited in my copending application may be used in place of the one herein recited as a specific example.

As the heat transferring liquid or medium operates at a temperature lying between the temperatures of the primary source of heat and of the water, my water heater is more efficient, raises the temperature of the water more quickly, and is more economical in operation than water heaters as heretofore constructed.

The heater is adapted to be used for supplying hot water to heating systems and the like. This heater comprises a water heating and storage tank 65, and cylindrical chambers 66 and 67 located, respectively, at the top and bottom of the tank. These chambers are provided for the reception of the heat transferring liquid, and are connected by tubes 68 which extend vertically through the tank 65. The combustion chamber 69 of this heater is located directly below the chamber 66, and the expansion chamber 70 for the combustion products is located directly above the chamber 67. Flues 71 smaller diametrically than the tube 68 and extending centrally through the tubes connect the combustion chamber 69 with the expansion chamber 70. The tubes 68 and flues 71 provide therebetween annular chambers 72. These chambers are also provided for the reception of the heat transferring liquid, and communicate at their ends with the chambers 66 and 67. A filler pipe 73 closed by a cap 74 communicates with the upper side of the chamber 67. The chamber 66 is provided in lower side with a drain plug 75. The tank 65 is provided near its lower end with cold water inlet nipples 76, and it is provided near its upper end with hot water outlet nipples 77. The nipples 76 and 77 may be connected by pipes to radiators or the like. Any of these nipples not in use may be closed by caps.

Spiral baffles 78 are located in and extend throughout the entire length of the flues 71. A gas burner 79 is located in the combustion chamber 69. The burner 79 is supplied with gas through a pipe 80 which extends thereto from a cut-off valve 81 under the control of a thermostat 82 located in the chamber 67. A pilot burner 83 in the combustion chamber 69 is supplied with gas through a tube 84 which is connected to a pipe 85 leading from the source of supply to the valve 81. The tube 84 and the pipe 80 are provided with cut-off valves 86 and 87, respectively.

A pipe 88 extends from the center of the expansion chamber 70 for connection with a chimney. A pipe 89 connected to the upper side of the chamber 67, and a pipe 90 extending from the side of the tank 1 provide means by which thermometers may be connected to the chamber and tank. A pipe 91 extending from the side of the tank 1 provides means by which a pressure gauge may be connected to the tank. The heater is mounted on feet 92. The combustion chamber 69 is provided with a door 93.

The chambers 66, 67 and 72 are filled with the heat transferring liquid, as indicated at 94. And the heat transferring liquid is located between the flame of the burner 79 and the water and between the water and the combustion products flowing through the flues 71. The heat transferring liquid is also located between the water and the expanding combustion products in the chamber 70.

This heater is also provided with a jacket 95 which surrounds the tank 65 and the chambers 66, 67 and 70, and arranged between these parts and the jacket is a suitable insulating material, not shown.

From the foregoing description, taken in connection with the accompanying drawing, it should be understood that the heater embodies a chamber so arranged with respect to the primary source of heat and the water that the heat transferring liquid is arranged between the primary source of heat and the water, and that, due to its position with relation to the primary source of heat and the water, the heat transferring liquid will transfer substantially all the heat units generated by the primary source of heat to the water. This transfer of the heat units by the heat transferring liquid takes place rapidly, with the result that the water may be raised to the required temperature in a comparatively short time. Furthermore, as the heat transferring liquid transfers substantially all the heat units generated by the primary source of heat, the water may be maintained at the desired temperature at comparatively little expense.

Having described my invention, what I claim is:

1. A water heater comprising a tank, partitions therein providing chambers in heat transmitting relation to the water in said tank, means providing an intermediate chamber within said tank communicating with said first named chambers, heating means at the bottom of the tank, and a flue extending from said heating means through said tank and through said first named chambers, said chambers adapted to contain a liquid for transferring heat from said heating means and flue to the water.

2. A water heater comprising a tank, partitions therein providing upper and lower chambers in heat transmitting relation to the water in said tank, means providing an intermediate chamber within said tank communicating with said upper and lower chambers, heating means below said lower chamber, and a flue extending from said heating means through said tank and through said upper and lower chambers, said intermediate chamber being arranged in surrounding relation to said flue, said chambers adapted to contain a liquid for transferring heat from said heating means and flue to the water.

3. A water heater comprising a tank, partitions therein providing upper and lower chambers in heat transmitting relation to the water in said tank, means providing an intermediate chamber within said tank communicating with said upper and lower chambers, means providing a combustion products expansion chamber in heat transmitting relation to said upper chamber, heating means below said lower chamber, and a flue extending from said heating means to said expansion chamber, said flue extending through said tank and said upper and lower chambers, said upper, lower and intermediate chambers adapted to contain a liquid for transmitting heat from said heating means, flue and expansion chamber to the water.

4. A water heater comprising a tank, partitions therein providing upper and lower chambers in heat transmitting relation to the water in said tank, means providing an intermediate chamber within said tank communicating with said upper and lower chambers, means providing a combustion products expansion chamber in heat transmitting relation to said upper chamber, heating means below said lower chamber, and a flue extending from said heating means to said expansion chamber, said flue extending through said tank and through said upper, lower and intermediate chambers, said upper, lower and intermediate chambers adapted to contain a liquid for transferring heat from said heating means, flue and expansion chamber to the water.

5. A water heater comprising a tank, a partition therein providing an upper chamber in heat transmitting relation to the water in said tank, means providing a combustion products expansion chamber in heat transmitting relation to said upper chamber, heating means below said tank, a flue extending from said heating means to said expansion chamber, said flue extending through said tank and said upper chamber, and a partition providing a chamber within said tank extending from the top of said heating means to said upper chamber, said chamber within said tank surrounding said flue and communicating with said upper chamber, said upper chamber and said chamber within said tank adapted to contain a liquid for transferring heat from said heating means, flue and expansion chamber to the water.

PHILLIP H. ELLIOTT.